Oct. 17, 1944.  G. V. HOLLOMAN ET AL  2,360,346
LEVELING DEVICE FOR INSTRUMENT FLYING AND
LANDING GROUND TYPE TRAINERS
Filed March 27, 1943   2 Sheets-Sheet 2
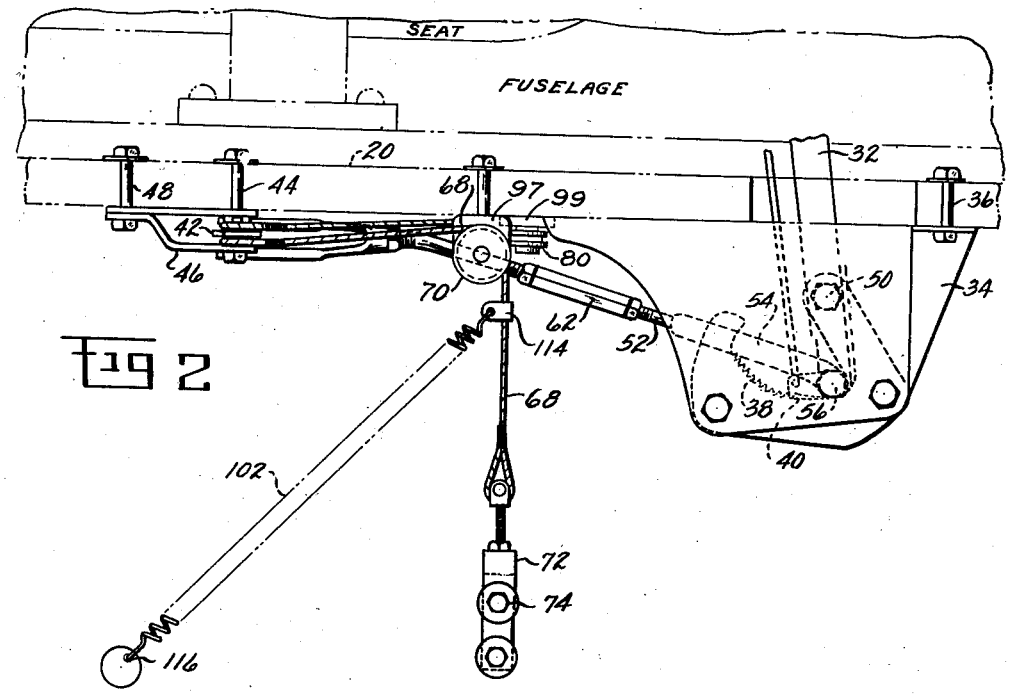
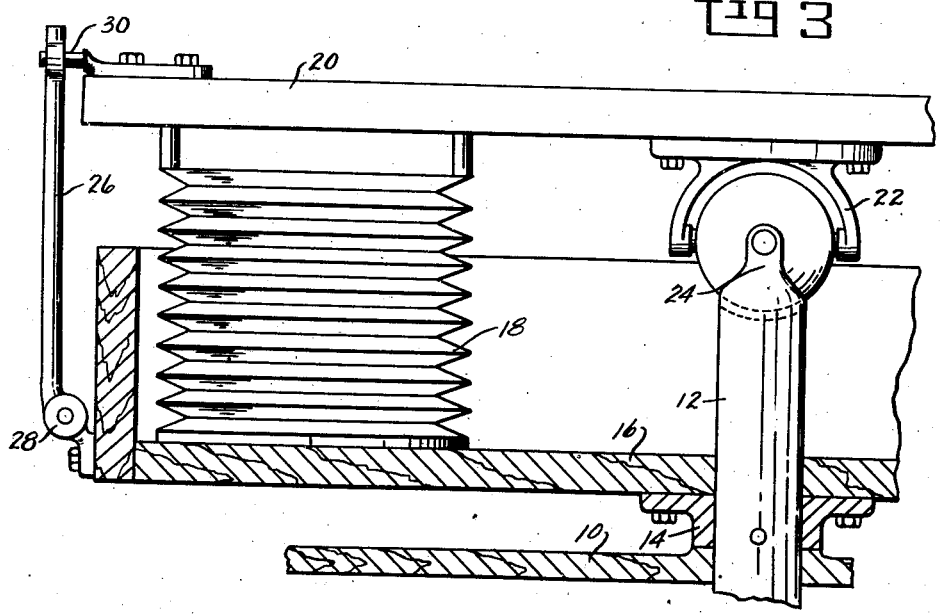
INVENTORS
GEORGE V. HOLLOMAN
RAYMOND K. STOUT
ATTORNEYS Patented Oct. 17, 1944

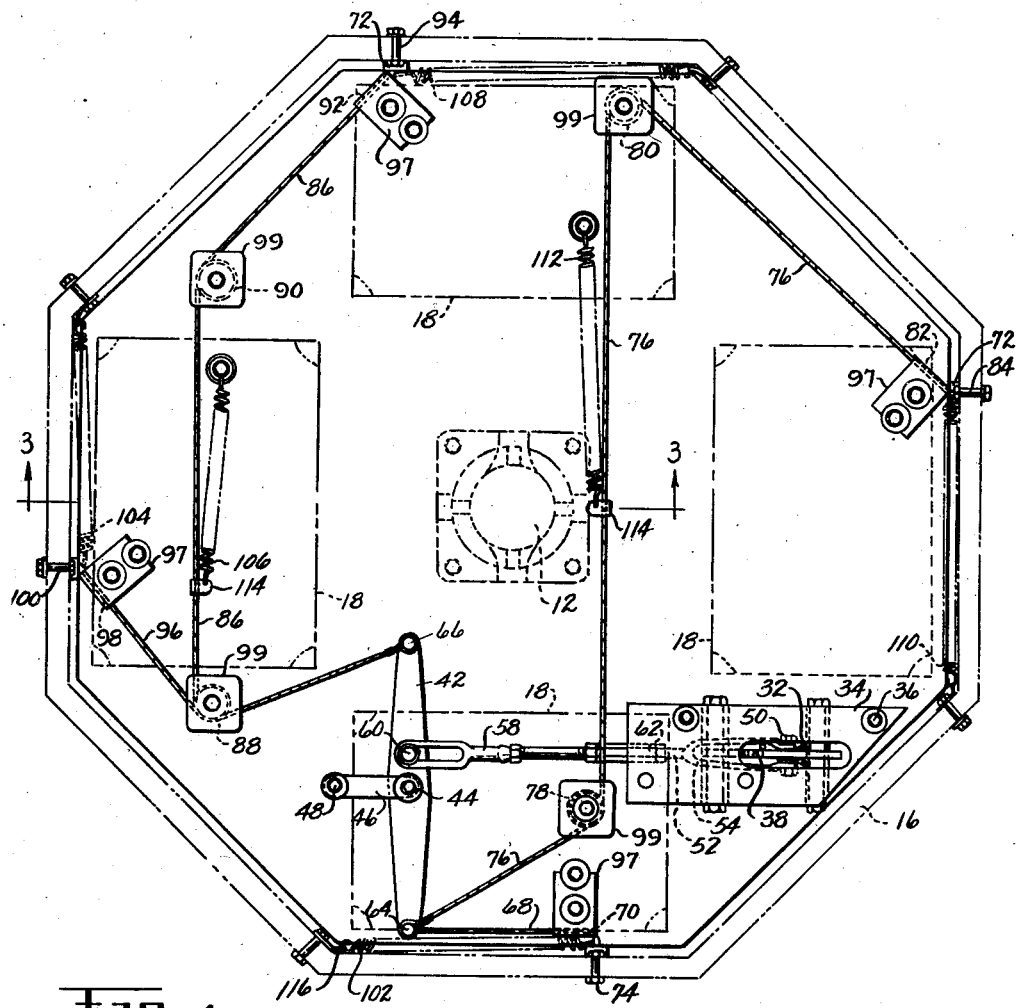

2,360,346

UNITED STATES PATENT OFFICE 2,360,346

LEVELING DEVICE FOR INSTRUMENT FLYING AND LANDING GROUND TYPE TRAINERS

George V. Holloman, Fairfield, and Raymond K. Stout, Dayton, Ohio

Application March 27, 1943, Serial No. 480,794
4 Claims. (Cl. 35—12)

(Granted under the act of March 3, 1883, as amended April 30, 1928; 370 O. G. 757)

The invention described herein may be manufactured and used by or for the Government for governmental purposes, without the payment to us of any royalty thereon.

This invention relates generally to aviation training apparatus of the kind in which a land supported plane fuselage may be made to tilt and rock after the manner of an airplane in flight, whereby the rudiments of flying may be taught on the ground. More specifically, however, the invention is concerned with an attachment for such apparatus which will stabilize it for more convenient and safe embarkation and disembarkation of the student aviator.

As presently practiced, when the student aviator is ready to disembark, he signifies this intent to an instructor or other person on the ground, who manually pulls the fuselage to a level position and locks it by any convenient latching means which will hold it in that position. This, of course, necessitates that a ground man be always in attendance to enable a student to disembark safely.

It is therefore an object of the invention to provide a readily accessible and easily operated means conveniently located in the cockpit whereby the student aviator may bring the fuselage of a trainer plane of this type to the position which it would assume in level flight, and, by a single movement, clamp it in such position in order that he may leave the plane safely, and re-enter it, if he desires, without help.

We attain this object, together with other advantages, by the mechanism which is hereinafter described and shown in the accompanying drawings, wherein Fig. 1 is a top plan view of an embodiment of the device which is the subject of our invention.

Fig. 2 shows part of the mechanism in front elevation.

Fig. 3 is a fragmentary section taken on the line 3—3 of Fig. 1.

Fig. 4 is a perspective view of a trainer plane equipped with our improved device.

The part of a trainer plane to which our invention appertains, and to which it is attached, consists of a base 10, from which a vertical shaft 12 extends upward. A motive power for rotating the shaft 12 is carried on the base 10, but, inasmuch as it forms no part of the present invention, it is not shown. A hub 14, drivably secured to the shaft 12 carries a box-like turntable 16, which is rotatable in a horizontal plane by the vertical shaft 12, but has no other movement. The box-like turntable 16, the top side of which is open, is of octagonal plan view, but may be of other configuration if desired.

Located in the turntable 16 are four bellows 18, which extend upwardly and support a platform 20, to which the fuselage (not shown) of the trainer plane is attached. The platform 20 is carried by one member 22 of a universal joint, the other member 24 of the joint being carried by the shaft 12, whereby the platform 20 is given unitary rotation with the turntable 16 but has the added capacity to tilt in any direction with relation to the turntable.

Control means (not shown) are provided for the four bellows 18 whereby a vacuum may be directed to one or another of the bellows to tilt the platform fore and aft or sidewise. Latch members 26 are hinged at 28 to the turntable 16. These latch members have openings at the upper end, which pass over stud members 30, the stud members being secured to the platform 20. Latches 26 may be employed to hold the platform in a horizontal position. They cannot, however, be reached by the student aviator when he is in the fuselage, and must therefore, be operated by some person on the ground before the student may safely leave the plane.

Our attachment supplements or replaces the latch means 26, but is capable of being operated by the student when he is seated in the fuselage of the trainer plane. The attachment essentially comprises a hand lever 32, which is somewhat like the brake lever of an automobile, in that it is carried on the platform 20 by a bracket 34, which is held in place by bolts 36. The usual ratchet teeth 38 and pawl 40 are carried on the bracket so that the lever, when drawn up, may maintain its drawn-up position.

A lever 42 is pivotally supported on the platform 20 by a stud 44, the stud being supported at the lower end by an outboard bearing member 46 which is secured to the platform by a bolt 48. The hand lever 32 is pivotally supported on the bracket 34 at 50 while a rod 52 is attached by a clevis 54 to the lower end as at 56. The free end of the rod is attached by the clevis 58 to a stud 60 carried on the arm 42. The turnbuckle 62 is provided for adjustment of the rod 52. The outer ends of the lever 42 carry the studs 64 and 66 to each of which two cables are secured. One cable 68 extends from the stud 64, to which it is anchored, over a small grooved pulley 70, then proceeds downward, the lower end being secured to a bolt 74 which passes through the side of the turntable 16. A second cable 76, also extending from the stud 64, passes over pulleys 78, 80 and 82, then proproceeds downward and is secured to another bolt 84 which passes through the side of the turntable 16. A third cable 86 extends from the stud 66, passing over the pulleys 88, 90 and 92, then downward and terminating at the bolt 94, which passes through the third side of the turntable. A fourth cable 96, also extending from the stud 66, passes over the single pulley 98 and downward to the bolt 100, which passes through the fourth side of the turntable. All four of the cables, at their lower ends, are provided with adjusting means as at 72 of Fig. 2. The pulleys 78, 80, 88, and 90 are all rotatably supported on studs which depend from brackets 99, while pulleys 79, 82, 92 and 98 are rotatable on studs which extend laterally from brackets 97, both kinds of brackets being secured to the underside of the platform 20. Obviously, when the lever 32 is drawn up, all of the cables become taut, and hold the platform 20 rigid with respect to the turntable 16, in which condition the fuselage of the plane may tilt neither from side to side nor pitch fore and aft.

The lever 32 is mounted near the right hand of the student, where it is readily accessible.

In order that the cables 68, 76, 86, and 96 may not become disarranged when the lever 42 is released, a series of take-up springs 102, 104, 106, 108, 110 and 112 are provided, one end of each spring being attached to a cable by a clip 114, and the other end to the inside of the turntable 16 near the bottom, as at 116, whereby, when the hand lever 32 is released, the slack in the several lengths of cable is resiliently taken up.

Having described our invention, we claim:

1. Apparatus for use on an aviation ground trainer of the type having a base, a turntable mounted on said base for rotation in a horizontal plane only, and a tilting platform above said turntable mounted thereon for unitary rotation therewith, but having its plane of rotation restrictedly tiltable in any direction with respect to the horizontal, said apparatus comprising a hand-lever bracket secured to said tilting platform, a hand lever pivotally mounted near its lower end on said bracket, ratchet and pawl means carried on said bracket and lever for holding said hand lever in its operated position, a cable-operating lever hinged intermediate its ends to the platform, a connecting rod connecting the hand lever to the cable-operating lever at a point intermediate its hinge point and one of its free ends, two cables anchored to each end of said cable-operating lever, four pulleys peripherally spaced around and secured to the platform, said cables extending one over each of said pulleys, then downward, an adjustable connector joining the end of each cable to the turntable, and a plurality of extended coil springs designed to take up slack in said cables each having one end connected to a point on a cable and the other to a point on the turntable.

2. Apparatus for use on an aviation ground trainer of the type having a base, a turntable mounted on said base for rotation in a horizontal plane only, and a tilting platform above said turntable mounted thereon for unitary rotation therewith, but having its plane of rotation restrictedly tiltable in any direction with respect to the horizontal, said apparatus comprising a hand-lever bracket secured to said tilting platform, a hand lever pivotally mounted near its lower end on said bracket, means carried on said bracket and lever for holding said hand lever in its operated position, a cable-operating lever hinged to the platform, a connecting rod connecting the hand lever to the cable-operating lever, four cables each having one end anchored to said cable-operating lever, four pulleys peripherally spaced around and secured to the platform, said cables extending one over each of said pulleys, then downward, means joining the end of each cable to the turntable, and a plurality of extended coil springs designed to take up slack in said cables each having one end connected to a point on a cable and the other to a point on the turntable.

3. Apparatus for use on an aviation ground trainer of the type having a base, a turntable mounted on said base for rotation in a horizontal plane only, and a tilting platform above said turntable mounted thereon for unitary rotation therewith, but having its plane of rotation restrictedly tiltable in any direction with respect to the horizontal, said apparatus comprising a hand-lever bracket secured to said tilting platform, a hand-lever pivotally mounted near its lower end on said bracket, means carried on said bracket and lever for holding said hand lever in its operated position, a cable-operating lever hinged to the platform, means operatively connecting the hand lever to the cable-operating lever, four cables anchored to said cable-operating lever, four pulleys secured to spaced-apart points on the platform, said cables extending one over each pulley then downward, and means joining one end of each cable to the turntable.

4. Apparatus for use on an aviation ground trainer of the type having a base, a turntable mounted on said base for rotation in a horizontal plane only, and a tilting platform above said turntable mounted thereon for unitary rotation therewith, but having its plane of rotation restrictedly tiltable in any direction with respect to the horizontal, said apparatus comprising a hand-lever bracket secured to said tilting platform, a hand lever pivotally mounted near its lower end on said bracket, means associated with said bracket and lever for holding said hand lever in its operated position, four pulleys at spaced-apart points on the platform, four cables each having one end anchored to the turntable, then passing upwardly and over one of said pulleys, and motion-transmitting means connecting the other end of each cable to the hand lever.

GEORGE V. HOLLOMAN.
RAYMOND K. STOUT.